B. H. LAWTER.
MOTOR PROPELLED AGRICULTURAL MACHINERY.
APPLICATION FILED MAR. 31, 1914.
1,145,776.
Patented July 6, 1915.
2 SHEETS—SHEET 2.
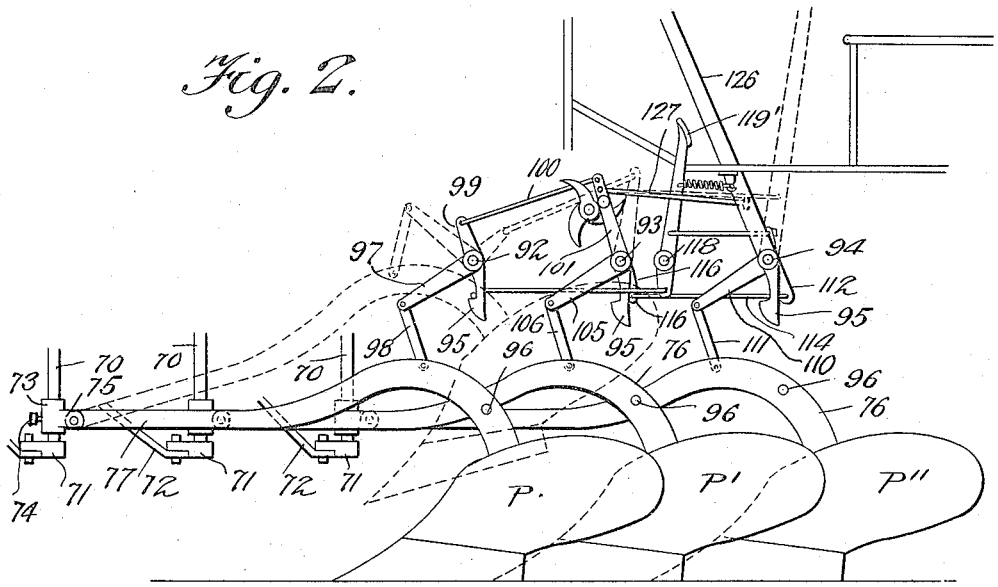
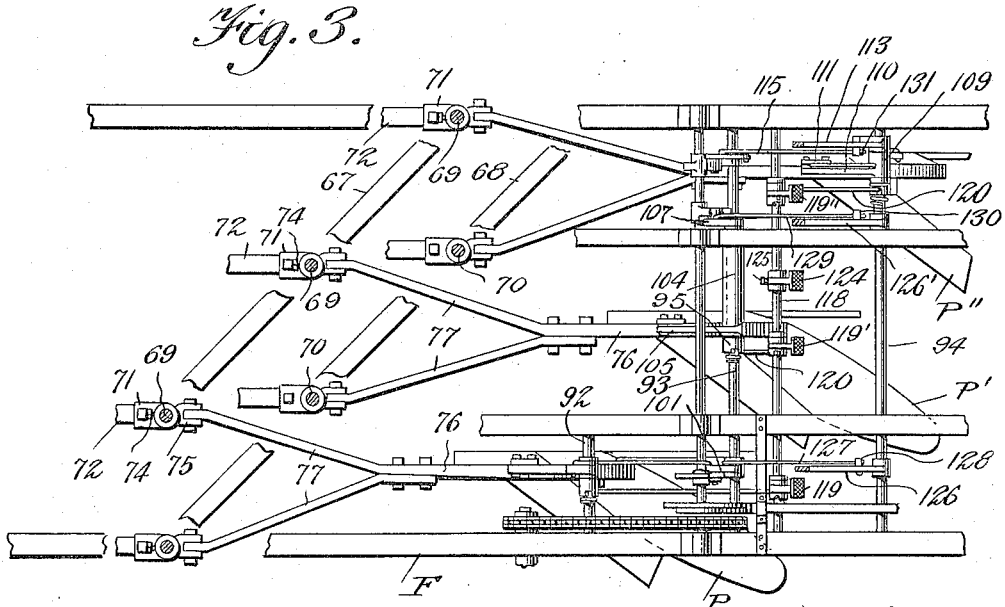
Inventor
B. H. Lawter
By Victor J. Evans
Attorney
Witnesses
Frederick R. Moran
Wm. Dagger

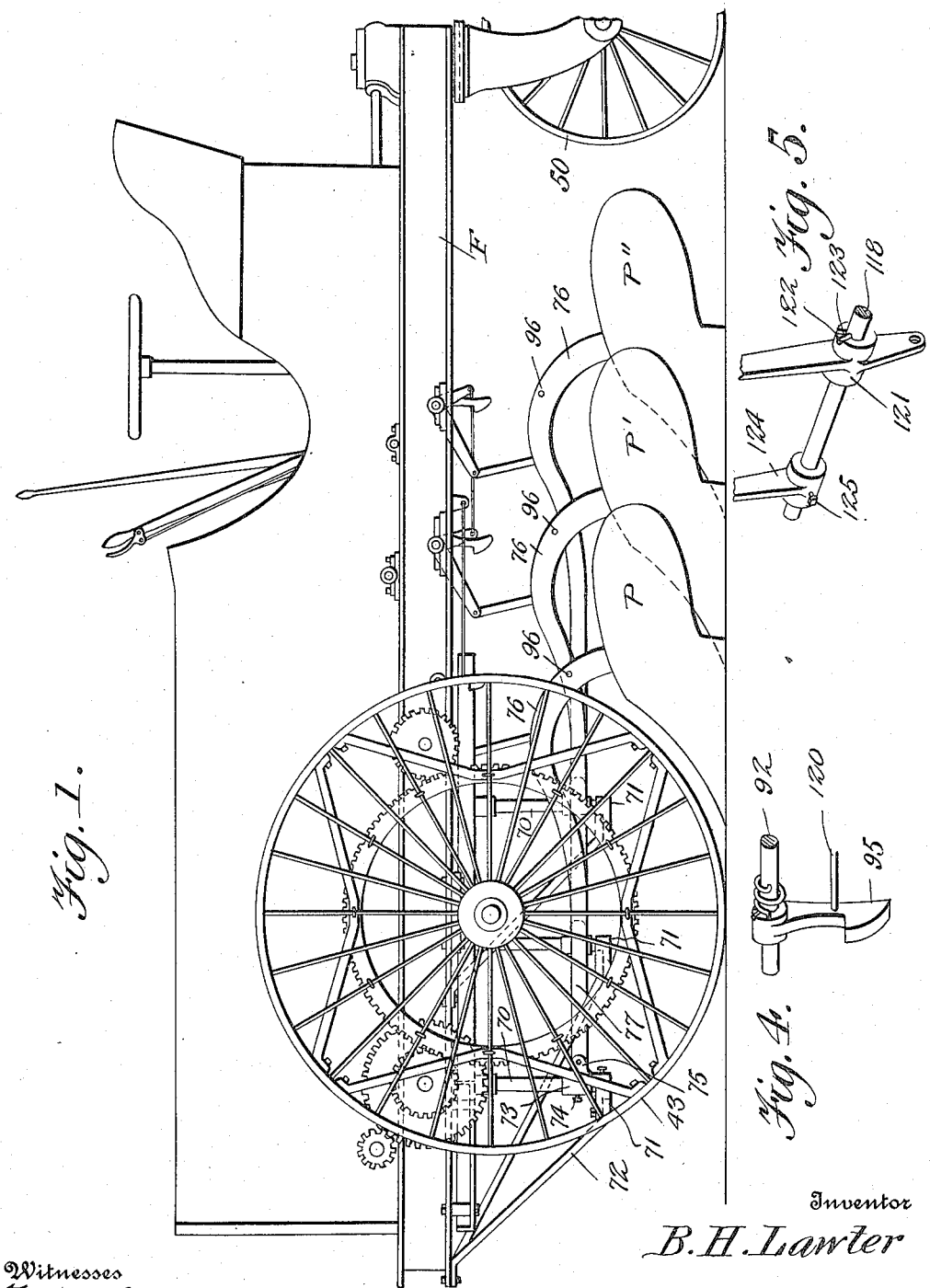

UNITED STATES PATENT OFFICE.

BENJAMIN H. LAWTER, OF NEWCASTLE, INDIANA, ASSIGNOR TO THE LAWTER TRACTOR CO., OF ST. MARYS, OHIO, A CORPORATION OF OHIO.

MOTOR-PROPELLED AGRICULTURAL MACHINERY.

1,145,776.    Specification of Letters Patent.    Patented July 6, 1915.

Original application filed January 31, 1913, Serial No. 745,427. Divided and this application filed March 31, 1914. Serial No. 828,538.

*To all whom it may concern:*

Be it known that I, BENJAMIN H. LAWTER, a citizen of the United States, residing at Newcastle, in the county of Henry and State of Indiana, have invented new and useful Improvements in Motor-Propelled Agricultural Machinery, of which the following is a specification.

This invention relates to motor propelled agricultural machinery, and it is a division of application, Serial Number 745,427, filed by me on January 31, 1913.

The general object of the invention is to produce a motor driven plow of simple and improved construction.

A particular object of the invention is to simplify and improve the construction of the means whereby the plows are connected with the tractor.

A further object of the invention is to provide simple and improved means whereby the plows may be suspended in a raised position above the ground, and whereby the said plows may be released to permit them to drop by gravity to earth-engaging position.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise details of construction therein exhibited, but that changes, alterations and modifications within the scope of the claims may be resorted to when desired.

In the drawings,—Figure 1 is a side elevation of a machine constructed in accordance with the invention. Fig. 2 is a diagrammatic view in side elevation of the plows constituting the gang and the suspending and supporting means. Fig. 3 is a diagrammatic plan view of the parts shown in Fig. 2. Fig. 4 is a perspective detail view of one of the plow supporting latch members or suspending hooks. Fig. 5 is a perspective detail view of some of the lifting levers.

Corresponding parts in the several figures are denoted by like characters of reference.

The tractor frame, herein generally designated by F, is supported on ground wheels, one of which appears at 43 and on a caster wheel shown at 50, the general construction of said frame being fully shown and described in the companion application, Serial No. 745,427. Extending obliquely across the frame on the underside thereof, and securely connected therewith are diagonal bars 67, 68, with which downwardly extending vertically disposed shafts 69, 70 are suitably connected. Each shaft 69 depending from the brace 67 is located in transverse alinement with a shaft 70 depending from the brace 68, and owing to the oblique arrangement of the braces 67, 68, it follows that the several pairs of shafts 69, 70 are positioned at various distances from the front end of the frame, for the convenient attachment of the plows, as will be presently described. Each of the shafts 69 and 70 is provided at its lower end with a flange collar 71 which in turn is connected by a brace 72 with the frame of the machine. Any desired number of pairs of shafts may be provided, according to the general dimensions of the machine and the number of plows that may be desired to be used in the gang, and each of the shafts 69 and 70 carries a sleeve 73 vertically adjustable thereon and capable of being secured at various adjustments by a set screw 74. Each of the sleeves 73 is provided with a lug 75. Each of the plows includes a beam 76 provided with forwardly divergent arms 77 which are pivotally connected with the lugs 75 of the sleeves 73 associated with a pair of shafts 69 and 70. It will be evident that by proper adjustment of the sleeves 73 on the respective shafts, the front ends of the plow beams may be raised or lowered for the purpose of causing the points of the plows to engage the ground at the desired angle for plowing a predetermined depth, such adjustment being effected before starting the operation of plowing.

Transverse supporting shafts 92, 93 and 94 are provided, one for each of the plows of which three have been shown, the forward left-hand plow being designated by P, the middle plow by P′, and the right-hand rear plow by P″. Each of the shafts 92, 93 and 94 carries a spring actuated hook or latch member 95, said latch members being adapted to engage pins or studs 96 on the beams of the respective plows for the purpose of supporting said plows above the ground, out of position for operation. The shaft 92 carries a bell crank having arms, one of which, 97, is connected by a link 98 with the beam of the plow P, the other arm, 99, of said bell crank being connected by a link 100 with an arm 101 that extends radially from the shaft 93 on which it is loosely mounted. The shaft 93 carries a sleeve 104 having radial arms 105, 107, one of which, 105, is connected by a link 106 with the beam 76 of the plow P′. The shaft 94 carries a sleeve 109 which is provided with radial arms that combine to form a bell crank, one of said arms, 110, being connected by a link 111 with the beam 76 of the plow P″, the other arm 112 of the bell crank being extended downwardly from the sleeve. An additional arm or lever 113 extending radially from the shaft 94 adjacent to the sleeve 109 constitutes a hand lever which is extended within convenient reach of the operator. The crank arm 112 and the lever 113 are connected by links 114, 115 with the arms of a lever 116 fulcrumed on the shaft 93.

A shaft 118, which is supported in parallel relation to the shafts 92, 93 and 94 carries a series of foot levers, three of which are designated by the numerals 119, 119′, 119″, each of said foot levers being connected by a link 120 with one of the latch members 95 for the purpose of actuating such latch member to release the plow supported thereby and permit such plow to drop by gravity to a ground engaging position. It has already been stated that each of the latch members 95 is spring actuated to maintain it in an engaging position with respect to the pin 96 of one of the plow beams. It will be further noted that each of the actuating levers has a collar 121, see Fig. 5, provided with a notch 122 which receives a pin or stud 123 extending from the shaft 118 on which the said levers are mounted, thereby limiting the movement of the latch members without interfering with their operation. An additional foot lever 124 is secured on the shaft 118 by means such as a set screw, indicated in Fig. 5 at 25; by means of said foot lever the shaft 118 may be rocked for the purpose of actuating the three latch members through the medium of the pins 123 engaging the walls of the notches 122, thus permitting the three plows to be simultaneously released and restored from an elevated to a ground engaging position.

For the purpose of raising or lifting the plows manually, as will sometimes be necessary when the machine is in motion, hand levers 126, 126′ are provided, said hand levers serving to elevate the plows P and P′; the plow P″ being lifted by means of the hand lever 113, previously described. The levers 126, 126′ are fulcrumed on the shaft 94 which also carries the hand lever 113, and said hand levers are extended within convenient reach of the operator. The lever 126 is connected by a link 127 which slidably engages a lug 128 extending from said lever, see Fig. 3, with the lever 101 which rocks on the shaft 93 and which, as previously described, is connected by the link 100 with the arm 99 of the bell crank controlling the plow P. It will be seen that by manipulating the lever 126 the bell crank may be rocked so as to lift the plow P. A link 129 which slidably engages a lug 130 projecting from the lever 126′ connects said lever with the arm 107 of the bell crank controlling the plow P′ so that the latter may be lifted by manipulating the lever 126′. The link 115 which connects the hand lever 113 with the lever 116 slidably engages a lug 131 projecting from said hand lever 113 by manipulating which latter the lever 116 may be rocked to actuate the bell crank comprising the arms 112, 110 and which controls the plow P″ for the purpose of lifting the latter. By reason of the links 127, 129 and 115 being slidably connected with the hand levers 126, 126′ and 113, it is obvious that when power means are employed for the purpose of lifting the plows, the position of the hand levers controlling said plows remains unchanged, and the hand lifting means for the several plows may be employed independently of one another without conflict.

Having thus described the invention, what is claimed as new, is:—

1. In a machine of the class described, a tractor frame, diagonal bars connected therewith, shafts depending from the diagonal bars and arranged in pairs transversely of the frame, and a plurality of plows each having a beam provided with forwardly diverging arms, each pair of diverging arms being connected with a pair of shafts.

2. A tractor frame having a pair of parallel diagonal bars connected therewith, shafts depending from said bars and arranged in pairs transversely of the frame, collars at the lower ends of said shafts, braces connecting the collars with the frame, a gang of plows, and means for connecting each plow with a pair of shafts.

3. A tractor frame, parallel bars extending obliquely across and connected with said frame, shafts depending from said bars and arranged in pairs transversely of the frame, braces extending between the frame and the lower ends of the shafts, collars adjustable on the shafts, and a gang of plows, each plow being connected with the collars on a pair of shafts.

4. A tractor frame, a pair of bars extending obliquely across and connected with the frame, shafts depending from said bars, said shafts being arranged in pairs transversely of the frame, collars adjustable on the shaft, a gang of plows including beams, and means for connecting the beam of each plow pivotally with the collars of a pair of shafts.

5. A tractor frame, a pair of parallel bars extending obliquely across and connected with the frame, shafts depending from said bars and arranged in pairs transversely of the machine, said shafts being positioned at various distances from the front end of the frame, collars vertically adjustable on the shafts, means for securing the collars at various adjustments, a gang of plows including beams, each beam being provided with forwardly divergent arms, and means for pivotally connecting the divergent arms of each beam with the collars of a pair of shafts.

6. A tractor frame, pairs of substantially vertical shafts associated therewith, said pairs of shafts being positioned at various distances from the front end of the frame, a gang of plows including beams, the beam of each plow being connected for vertical adjustment with a pair of shafts, a plurality of shafts positioned above the several plows, a spring actuated latch member on each shaft, and pins associated with the respective plow beams for engagement with the several latch members to support the plows in raised position.

In testimony whereof I affix my signature in presence of two witnesses.

BENJAMIN H. LAWTER.

Witnesses:
A. J. INDERRIEDEN,
H. E. JENNINGS.

Copies of this patent may be obtained for five cents each, by addressing the "Commissioner of Patents, Washington, D. C."